United States Patent [19]

Kobayashi et al.

[11] Patent Number: 4,550,437
[45] Date of Patent: Oct. 29, 1985

[54] APPARATUS FOR PARALLEL PROCESSING OF LOCAL IMAGE DATA

[75] Inventors: Yoshiki Kobayashi; Tadashi Fukushima, both of Hitachi, Japan

[73] Assignee: Hitachi, Ltd., Tokyo, Japan

[21] Appl. No.: 389,498

[22] Filed: Jun. 17, 1982

[30] Foreign Application Priority Data

Jun. 19, 1981 [JP] Japan .................................. 56-94048

[51] Int. Cl.⁴ .......................... G06K 9/00; G06F 15/20
[52] U.S. Cl. ...................................... 382/41; 358/166; 364/200; 382/27
[58] Field of Search ............................. 382/41, 42, 27; 358/166, 167, 213, 284; 364/728, 725, 819, 820, 200 MS File, 900 MS File

[56] References Cited

U.S. PATENT DOCUMENTS

| | | | |
|---|---|---|---|
| 3,588,486 | 6/1971 | Rosen | 382/41 |
| 4,194,221 | 3/1980 | Stoffel | 382/42 |
| 4,224,600 | 9/1980 | Sellner | 382/41 |
| 4,328,426 | 5/1982 | D'Ortenzio | 382/41 |
| 4,363,104 | 12/1982 | Nussmeier | 382/41 |

*Primary Examiner*—Leo H. Boudreau
*Attorney, Agent, or Firm*—Antonelli, Terry & Wands

[57] ABSTRACT

An apparatus for parallelly processing image data from a local image data source, in which m rows x n columns of image data are processed by simultaneously processing n image data for each of the m rows (m and n being integers). The apparatus includes a member for serially receiving image data, a memory section having processing parameter data stored therein, a plurality of juxtaposed processor stages coupled to the memory section and arranged to be simultaneously supplied with sequentially shifted image data to thereby simultaneously produce processing results from the supplied image data and the processing parameter data, and an output section for receiving the outputs of the processor stages and delivering a processed output. The processing apparatus is suitable to be implemented in an IC form.

13 Claims, 21 Drawing Figures

F I G. 5
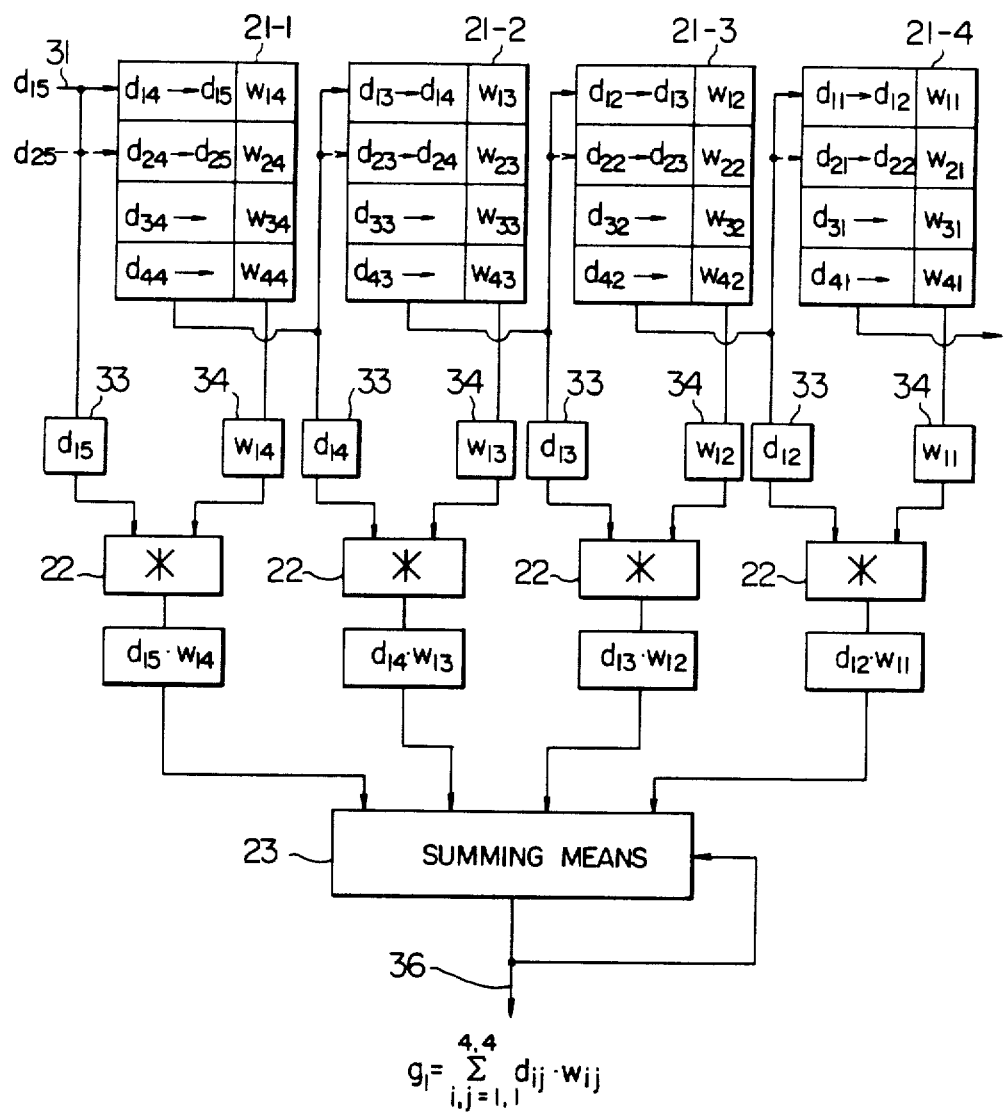

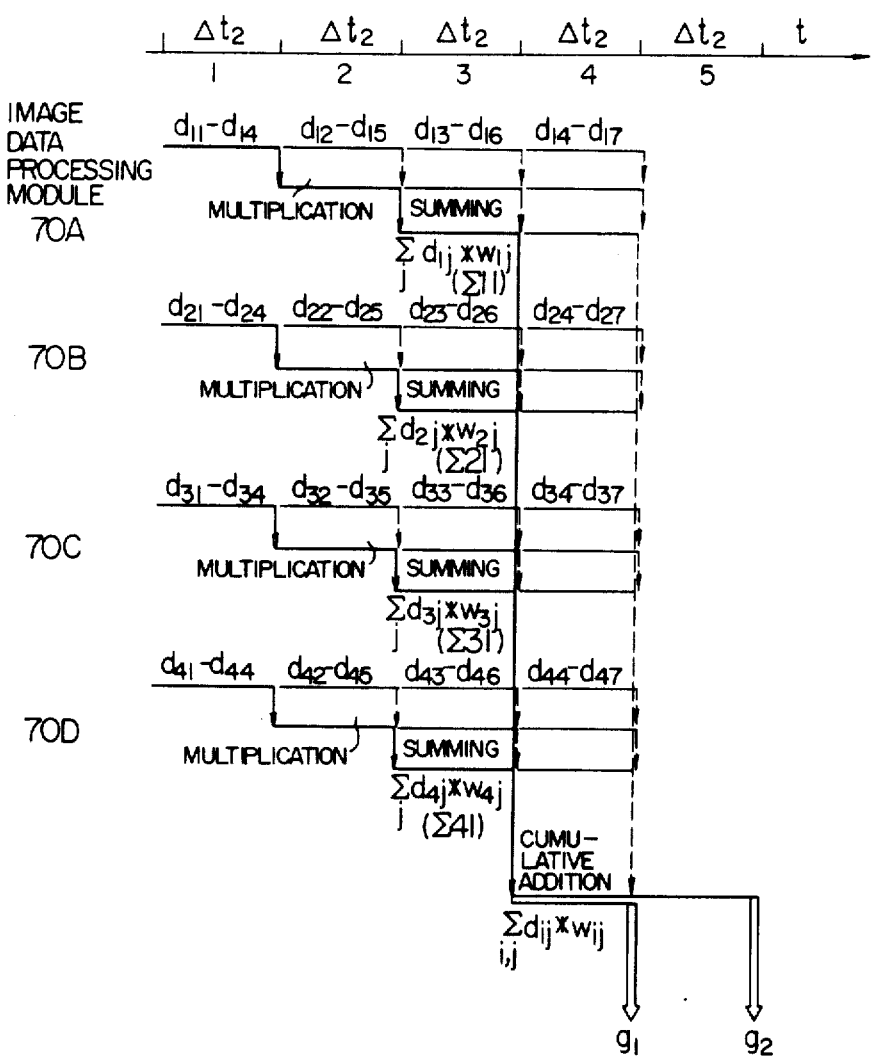

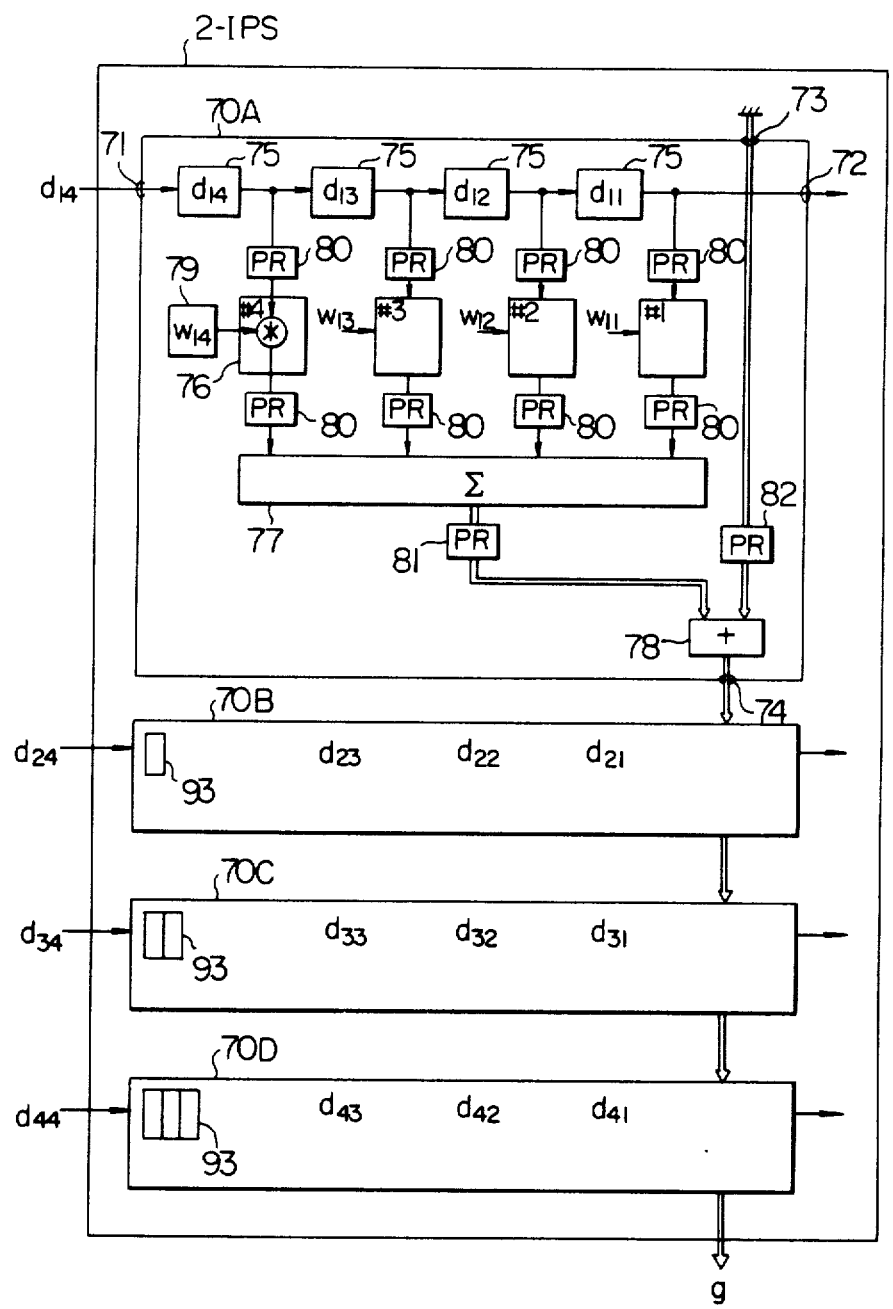

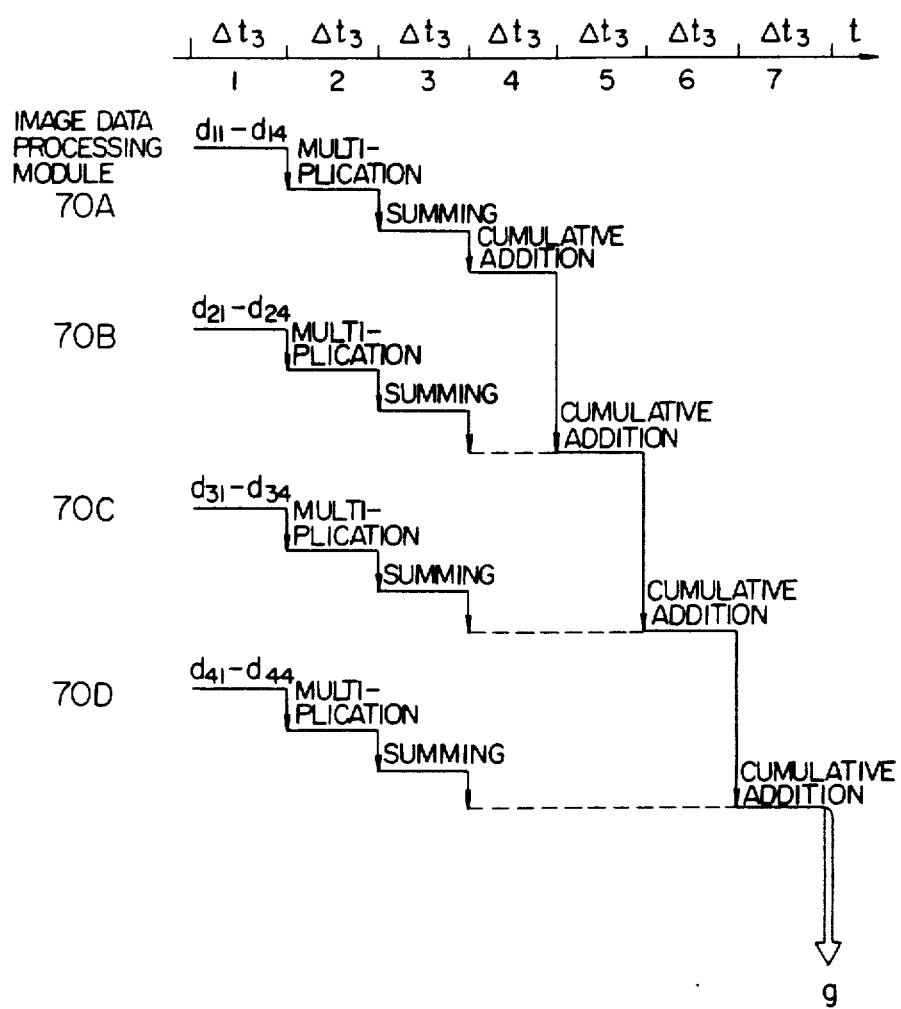

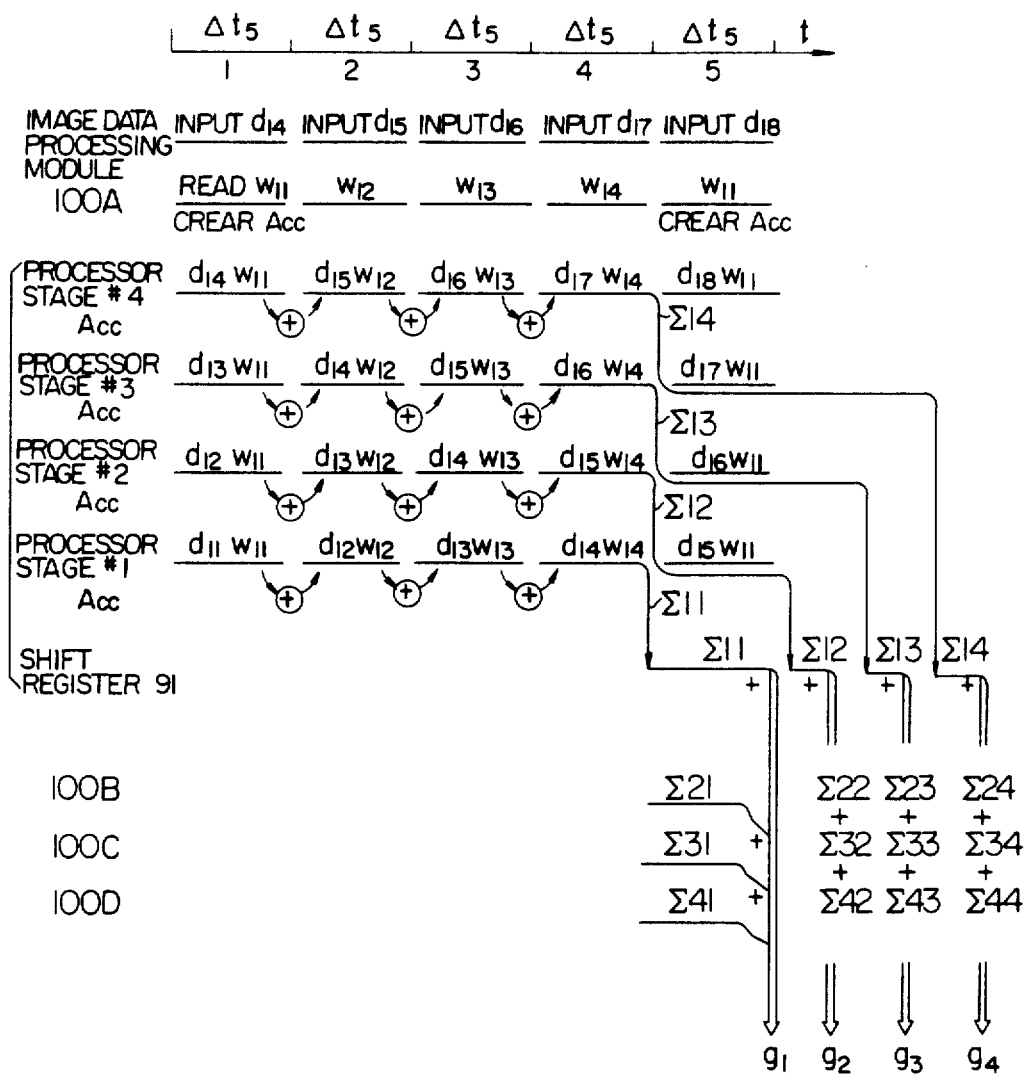

APPARATUS FOR PARALLEL PROCESSING OF LOCAL IMAGE DATA

The present invention relates in general to an apparatus for parallelly processing local image data, e.g., for parallelly effecting spatial convolution of local image data and to apparatus having an architecture suited for implementation in an LSI configuration.

Many conventional image data processors are so designed as to process image data in parallel with a view to increasing the processing speed. See, for example, Japanese Patent Application Laid-Open No. 141536/76 (laid open on Dec. 6, 1976). However, since the image data is of two-dimensional nature, it will be difficult to parallelly process all of the data. Since the image data processors are mostly intended to effect parallel processing of image data for picture elements positioned close to one another, such as a spatial convolution for noise elimination or image contour emphasis, the parallel processing is mostly effected for local image data for m rows×n of elements. There has not been known yet any apparatus for parallel processing of local image data which is implemented in the form of an LSI. In reality, a great difficulty is encountered in realizing such processing apparatus of the hitherto known architecture in an LSI form in view of the extremely high integration density and the great number of connector pins required.

An object of the present invention is to provide an apparatus for parallelly processing local image data which apparatus may be implemented in a large scale integrated circuit or LSI.

According to one aspect of the present invention, for parallel processing of local image data of m rows×n columns, n processor units are juxtaposed each including a data memory having m processing parameter data stored therein and serving to store m image data and each including a processor stage so that m image data for each of the n rows are sequentially or serially supplied to the juxtaposed processor units and the so supplied image data is sequentially or serially shifted for each row between the juxtaposed processor units whereby n image data for one row are simultaneously (parallelly) processed each time a shift of the image data is effected for the processor units, and such simultaneous processing is repeated m times. With this structure, the number of processor elements required for the local image data processing is reduced to 1/m of that in the prior art apparatus and hence the number of image data input pins is also reduced to 1/m of that in the prior art device, which provides an architecture facilitating implementation of the image data processing apparatus in an LSI form.

According to another aspect of the present invention, for parallel processing of local image data of m rows and n columns, m image data processing modules are connected in cascade each including n juxtaposed processor stages each coupled to memory means having n processing parameter data stored therein so that image data of a different one of the m rows is sequentially or serially supplied to each of the processing modules and the so supplied image data is sequentially or serially shifted for each row between the juxtaposed processor stages whereby n image data for one row is simultaneously (parallelly) processed each time a shift of the image data is effected for the juxtaposed processor stages in each of the processing modules. With this structure, each of the image data processing modules may have to be provided with only one input port for receiving image data to be processed and one output port for delivering processed image data, which provides an architecture factilitating implementation of the image data processing apparatus in an LSI form.

The present invention will now be described by way of an exemplified embodiment with reference to the accompanying drawings, in which:

FIGS. 3 to 5 are a block diagram of one embodiment of the present invention and diagrams illustrating the operating steps of this embodiment;

FIGS. 10A, 10B, 11A and 11B are block diagrams and operational time charts of modified forms of the embodiment shown in FIG. 9A;

FIGS. 13A and 13B are a block diagram and an operational time chart of another embodiment of the present invention.

Figure 1:
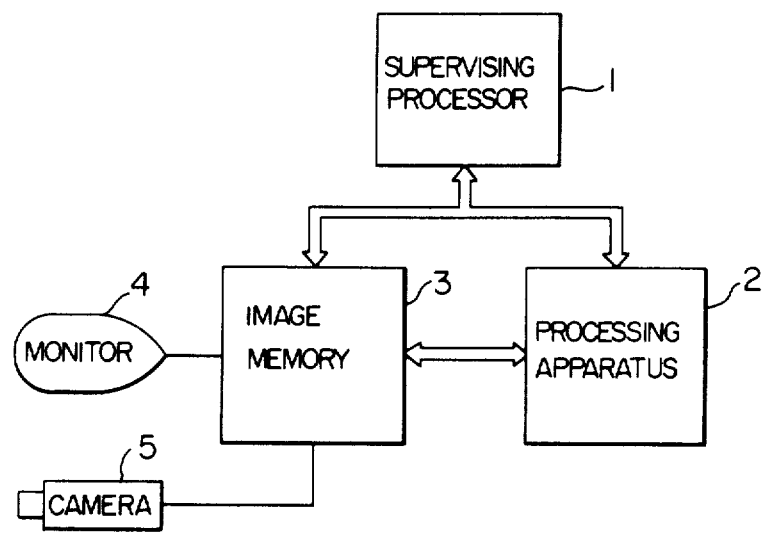
FIG. 1 is a block diagram of an example of the general structure of an image data processing system.

Referring to FIG. 1 which shows schematically a general structure of a typical image data processing system, the system comprises an ITV camera 5 serving as an image data pickup unit, an image memory 3 serving as a storage for image data supplied from the camera 5 and a CRT monitor 4 which serves to display the content of the image memory 3. The image information or data stored in the image memory 3 is processed by an image data processing apparatus 2, the result of the processing is again stored in the image memory 3 and-/or supplied to a supervising processor 1 for controlling the whole system.

Figure 2:
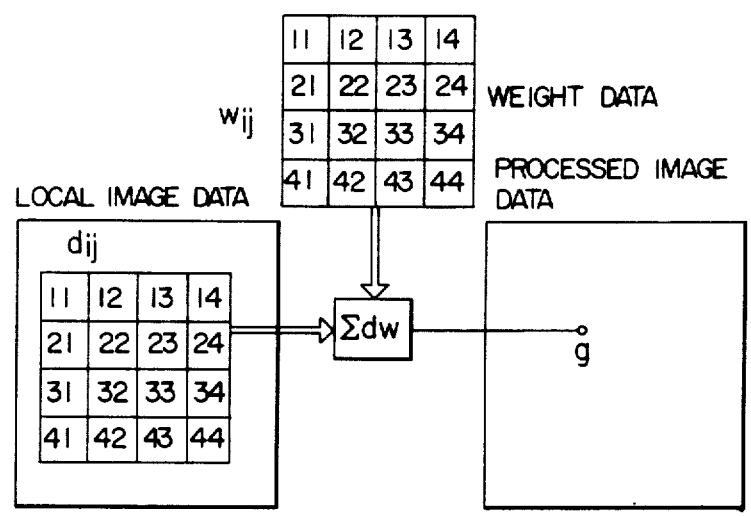
FIG. 2 is a diagram useful for explaining parallel processing of local image data.

As a typical image data processing function, there is a known spatial convolution function or a so-called spatial filter function according to which, as shown in FIG. 2, local image data $d_{11}, d_{12}, \ldots, d_{44}$ for picture elements in a 4 (rows)×4 (columns) matrix, for example, are multiplied by predetermined weight data $w_{11}, w_{12}, \ldots, w_{44}$ (i.e. weighting factors), respectively, and the total sum of the resultant products is arithmetically determined to obtain a processing result g. By selecting appropriate magnitudes or values of the weights or weight data $w_{ij}$, the image data processing, such as elimination of noise, emphasis of image contours and the like can be accomplished.

Figure 3:
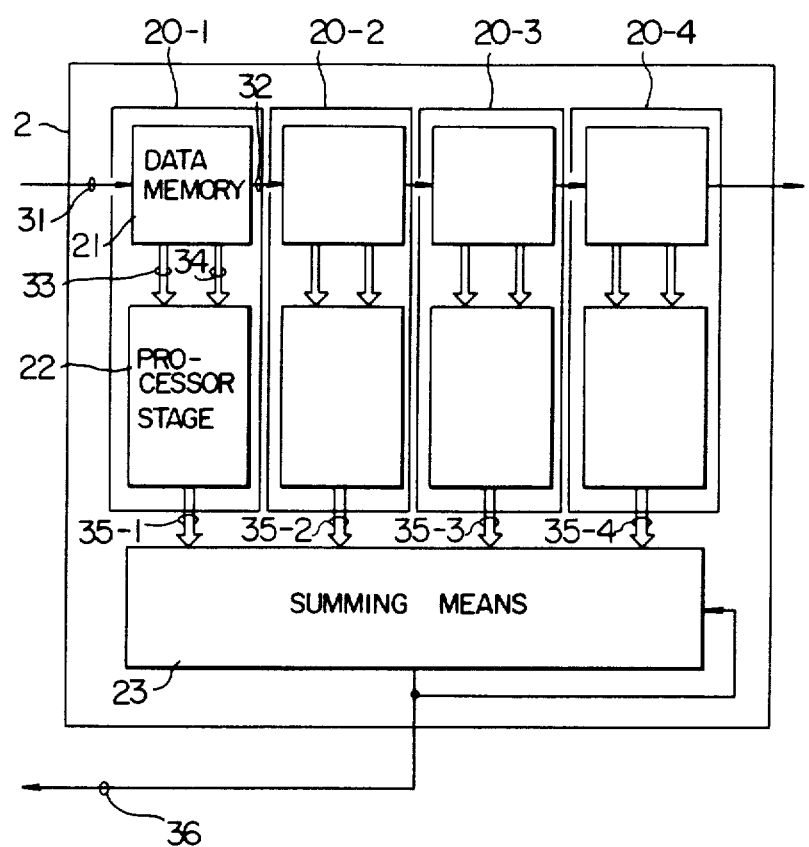

An embodiment of the present invention will now be described with reference to FIGS. 3 to 5.

In this embodiment, it is assumed that local image data for m rows×n of elements (hereinafter, simply referred to as "m×n image data") is intended to be processed. The image data parallel processing apparatus 2 is in a large scale integrated (LSI) circuit configuration including four juxtaposed processor units (the same number of processor units as the column number) 20-1 to 20-4 and summing means 23. Each of the processor units includes, for a predetermined processing, such as the spatial convolution, a data memory 21 for storing therein m (four, in this embodiment) local image data and processing parameter data, such as weight data, and each including a processor stage 22.

The data memory 21 of each processor unit is supplied with image data 31 externally of the LSI image data processing apparatus 2 as indicated by an arrow 31 or from the data memory 21 of the adjacent processor unit as indicated by 32 and sequentially shifted between the processor units. Further, each of the processor stages 22 is supplied with two kinds of data, for example, image data and weight data from the associated data memory 21, as indicated by arrows 33 and 34. The summing means 23 serves to sum the outputs 35-1 to 35-4 of the four processing units 20-1 to 20-4 representative of the results of the arithmetic operation and to cumulatively add the outputs of the summing means 23 itself, whereby a processing result 36 is delivered from the summing means 23.

Next, referring to FIGS. 4 and 5, description will be made as to the manner in which local image data is supplied to the LSI image processing apparatus 2 and the procedures for executing the spacial convolution. It is assumed that predetermined weight data $w_{11}$, $w_{12}$, . . . , $w_{44}$ has been stored in the memory areas of the data memory 21 as shown in FIG. 5. In the first place, $4\times 4$ local image data $d_{11}$ to $d_{44}$ is written or stored in the data memory 21 through repetition of individual column scanning in the horizontal or row direction from the left hand side as indicated by an arrow at (a) in FIG. 4. That is, the local image data is supplied on a single picture element basis to the data memory 21 in the image data processing apparatus 2 sequentially starting from the leftmost vertical column image data $d_{11}$, $d_{21}$, $d_{31}$ and $d_{41}$ for the four picture elements up to the rightmost vertical column image data $d_{14}$, $d_{24}$, $d_{34}$ and $d_{44}$ for the four picture elements as viewed on FIG. 4 so that image data $d_{14}$, $d_{24}$, $d_{34}$ and $d_{44}$ is stored in the data memory 21-1 of the processor unit 20-1, image data $d_{13}$, $d_{23}$, $d_{33}$ and $d_{43}$ is stored in the data memory 21-2 of the processor unit 20-2, image data $d_{12}$, $d_{22}$, $d_{32}$ and $d_{42}$ is stored in the data memory 21-3 of the processor unit 20-3, and image data $d_{11}$, $d_{21}$, $d_{31}$ and $d_{41}$ is stored in the data memory 21-4 of the processor unit 20-4 as indicated at (a) in FIG. 4 and in FIG. 5. It is further assumed that the arithmetic operation for the spatial convolution of the $4\times 4$ local image data $d_{ij}$-1 as indicated at (a) by a broken line block in FIG. 4 has been completed, whereupon the operation for the spatial convolution for the horizontally next local image data $d_{ij}$-2 displaced by one column in the row direction as shown at (b) by a dot-dash line block in FIG. 4 is next to be effected.

Figure 4:
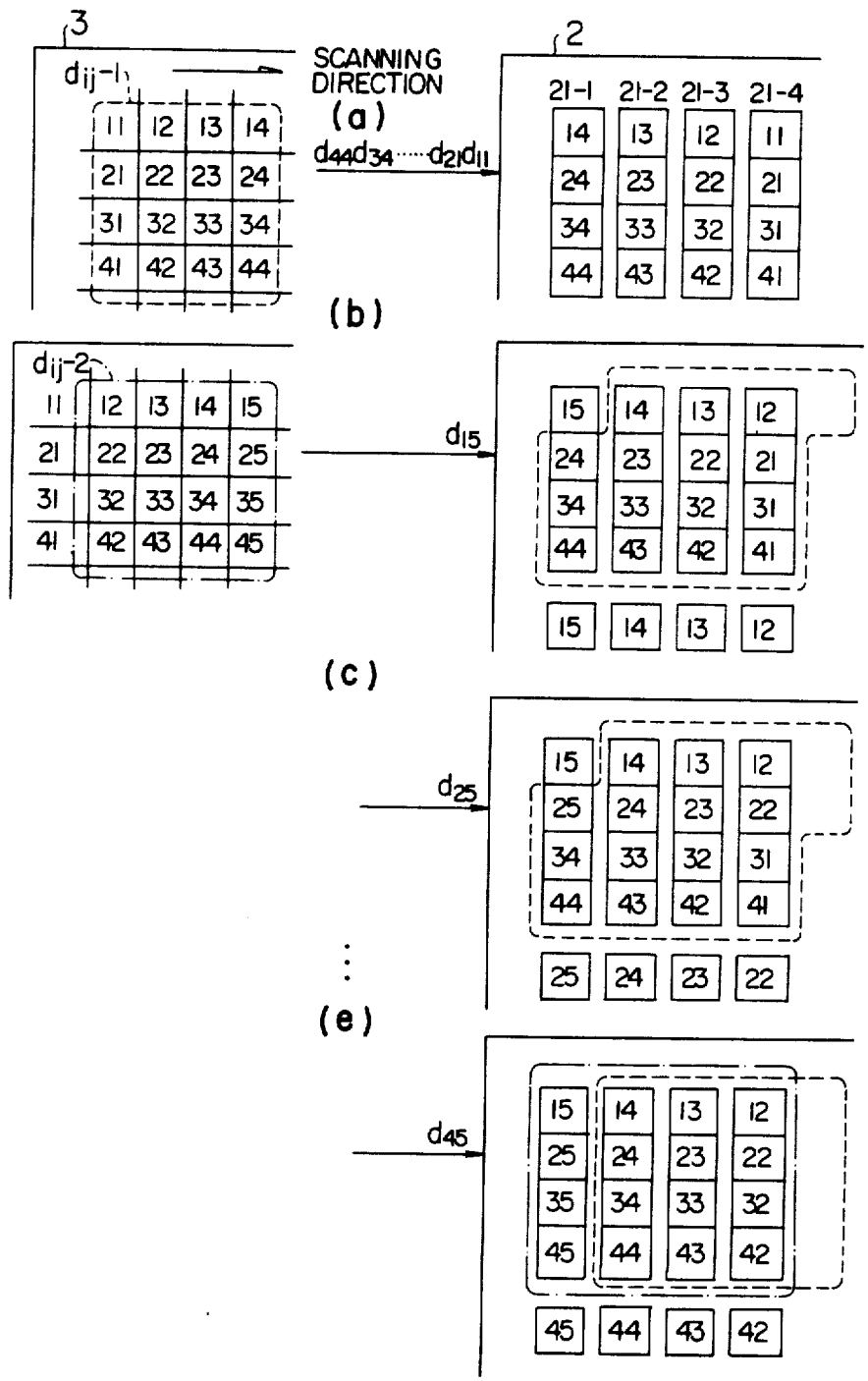

When image data $d_{15}$ for the first picture element belonging to the succeeding column is inputted, as shown at (b) of FIG. 4, the image data $d_{14}$, $d_{13}$, $d_{12}$ and $d_{11}$ stored in the corresponding areas in the first row of the data memories 21-1 to 21-4 is shifted to the right as viewed in FIG. 4, whereby the image data $d_{15}$, $d_{14}$, $d_{13}$ and $d_{12}$ is now stored in the above-mentioned first row areas of the data memories 21-1 to 21-4 of the processor units 20-1 to 20-4, as also shown in FIG. 5. These picture elements represent by the image data $d_{15}$, $d_{14}$, $d_{13}$ and $d_{12}$ simultaneously undergo an arithmetic operation for determining the products with the corresponding weight data $w_{14}$, $w_{13}$, $w_{12}$ and $w_{11}$, respectively, at the associated processor stages 22.

When the second image data $d_{25}$ (i.e., the image data for the picture element at the second row of the same column) is inputted, the image data $d_{24}$, $d_{23}$, $d_{22}$ and $d_{21}$ stored in the corresponding areas in the second row of the data memories 21-1 to 21-4 is shifted horizontally one by one, whereby the image data $d_{25}$, $d_{24}$, $d_{23}$ and $d_{22}$ is now stored in the above-mentioned second row areas of the data memories 21-1 to 21-4 of the processor units 20-1 to 20-4. This image data $d_{25}$, $d_{24}$, $d_{23}$ and $d_{22}$ simultaneously undergoes an arithmetic operation to determine the products with the corresponding weight data $w_{24}$, $w_{23}$, $w_{22}$ and $w_{21}$ at the associated processor stages. A partial sum of the products thus derived is also arithmetically determined by the summing means 23.

In a similar manner, image data $d_{35}$ and $d_{45}$ at the third and fourth rows is inputted, whereby the products of the image data $d_{35}$, $d_{34}$, $d_{33}$ and $d_{32}$ and $d_{45}$, $d_{44}$, $d_{43}$ and $d_{42}$ with the respective weight data $w_{34}$, $w_{33}$, $w_{32}$ and $w_{31}$ and the weight data $w_{44}$, $w_{43}$, $w_{42}$ and $w_{41}$ are determined at the associated processor stages 22, which are followed by the summation of these products, as described above.

In this manner, the products of the image data $d_{15}$, $d_{25}$, $d_{35}$ and $d_{45}$ and the corresponding weight data $w_{14}$, $w_{24}$, $w_{34}$ and $w_{44}$ are arithmetically determined by the processor unit 20-1. In a similar manner, the products are, respectively, determined by the processor units 20-2 to 20-4. These outputs of the processor units 20-1 to 20-4 are cumulatively added to determine the total sum by the summing means 23, whereby the output data 36 (or g) representative of the result of the spatial convolution executed for the local image data $d_{ij}$-2 is obtained.

Figure 6A:
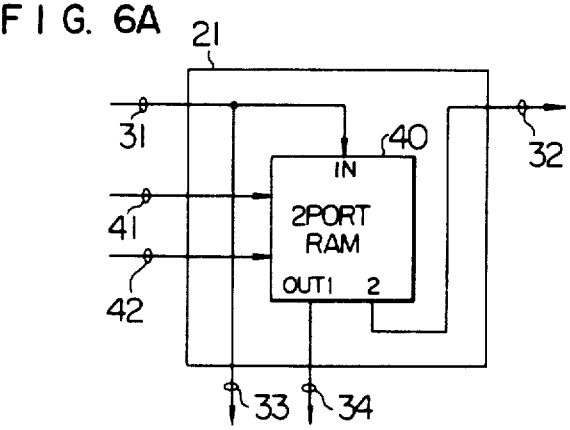
FIGS. 6A and 6B are diagrams illustrating an example of the structure of and the operation of a data memory which may be used in the present invention.
Figure 6B:
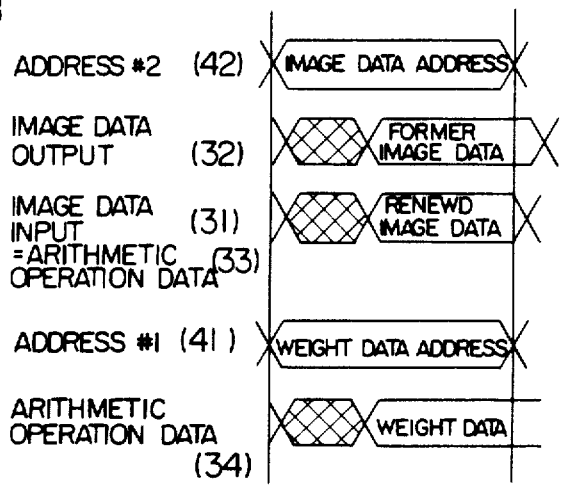

FIGS. 6A and 6B show an exemplary embodiment of the data memory 21 incorporated in each processor unit. The illustrated data memory 21 is constituted by a two-port random access memory or RAM 40 having a sufficient capacity for storing therein image data and processing parameter data such as weight data. As will be seen from the time chart shown in FIG. 6B, the image data 32 to be shifted is read out through the second port and delivered to the data memory of the succeeding adjacent processor unit, while the input data to be processed is stored at the same address or area as that of the former image data read out through the second port and at the same time the image data 32 is fed to the processor stage 22 as the data 33 for the arithmetic operation described hereinbefore. On the other hand, the weight data corresponding to the above data 33 is also read out from the two-port RAM 40 through the first port to be supplied to the processor stage 22 as the second data 34 for the arithmetic operation.

As a modification of the two-port RAM 40, it is possible to provide two RAM's separately, wherein one of the RAM's is used for storing the image data with the other RAM being used for storing the processing parameter data such as the weight data for the convolution operation and others. In that case, the RAM for the image data storage may be constituted by a shift register.

Figure 7A:
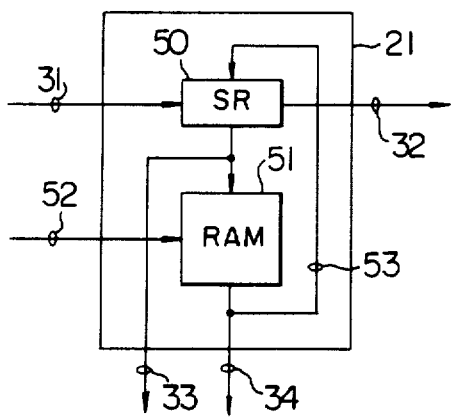
FIGS. 7A, 7B, 8A and 8B are diagrams illustrating two other examples of and the operation of a data memory which may be used in the present invention.
Figure 7B:
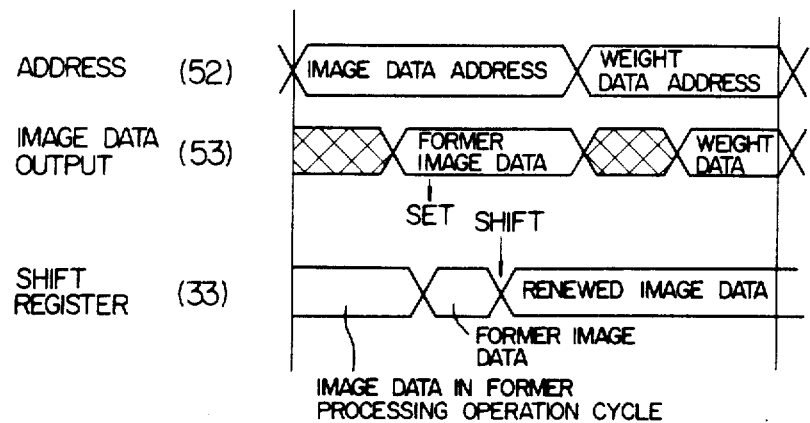

FIGS. 7A and 7B show another exemplary embodiment of the data memory 21 which is constituted by a shift register 50 and a one port RAM 51 of the conventional type. As will be seen from the time chart shown in FIG. 7B, the image data 53 to be shifted is at first read out (address 52) and loaded in the shift register 50 to be supplied to the data memory of the succeeding adjacent processor unit. On the other hand, the image data 31 determined to be inputted for processing is shifted and loaded into the shift register 50 to be outputted as one of the data 33 for the arithmetic operation and written simultaneously in the RAM 51. Subsequently, corresponding weight data is read out (address 52) to be supplied to the associated processor stage 22 as the other data 34 for the aforementioned arithmetic operation. With the arrangement of the data memory 21 shown in FIG. 7A, the inner circuit configuration of the RAM can be simplified because there is no necessity to employ the two-port RAM, although the time required for the processing is increased to some degree. Further, the data memory configuration shown in FIG. 7A is advantageous in that data transfer between remote processor units can be effected at a high speed merely through the interposition of shift registers, provided that the latter are bidirectional shift registers.

Figure 8A:
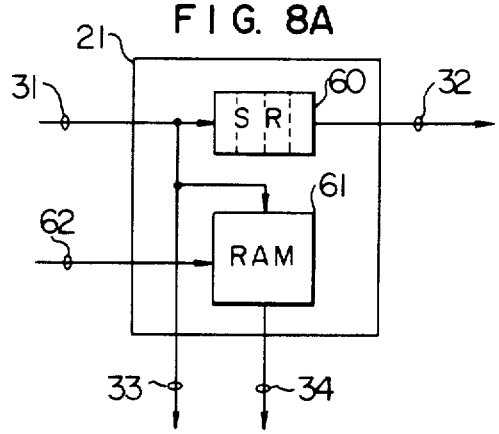
Figure 8B:
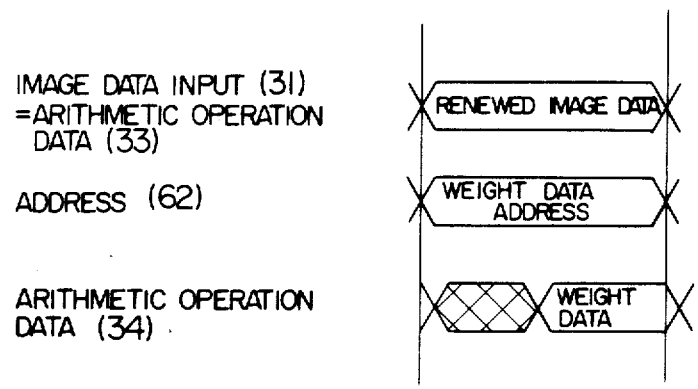

FIGS. 8A and 8B show still another version of the data memory 21. The image data 31 to be inputted is loaded in a shift register 60 adapted to delay the input image data by a predetermined number of the picture elements and is at the same time supplied to the associated processor stage 22 as the operation data 33. More particularly, in the case where the local image data is 4 (rows)×4 (columns) as mentioned above, the input image data 31 is delayed by the same number of stages as the column number, i.e., four shift stages and thereafter supplied to the succeeding data memory as the image data 32. On the other hand, the corresponding weight data is read out from a RAM 61 as the other operation data 34. This configuration of the data memory 21 is advantageous in that the inputting and the outputting of the data 31 and 32 can be accomplished at an increased speed because there is no necessity of resorting to cooperation of the RAM 61.

As versions of the shift register 60, it may be constituted by a RAM or by a first-in first-out (FIFO) buffer. In any case, it is desirable that the delay brought about by the shift register 60 be variable, depending upon the number n of the rows in the local image data.

Another embodiment of the present invention will be described with reference to FIGS. 9A and 9B. In the present embodiment, it is also assumed that 4 rows×4 columns of local image data are intended to be processed. The image data parallel processing apparatus 2-I is in a large scale integrated circuit configuration including four image data processing modules (the same number of processing modules as the row number) 70A to 70D in cascade connection. The apparatus 2-I is supplied with local image data (image data $d_{14}$, $d_{24}$, $d_{34}$ and $d_{44}$ in FIG. 9, for example) column by column simultaneously or parallelly from the image memory 3 and the processing results may be stored again in the image memory 3.

Each of the cascade-connected image data processing modules 70A to 70D has one input port 71 through which image data to be processed is to be introduced and one output port 74 through which processing results are to be delivered. Each of the processing modules 70A to 70D includes a weight data memory 79 constituting means having four weight data (the same number of weight data as the column number) stored therein, four juxtaposed processor stages (the same number of juxtaposed processor stages as the column number) 76 each having a multiplier coupled to the weight data memory 79, a shift register 75 having a stage provided for each of the processor stages 76, a summing circuit 77 constituting means for summing the outputs of the processor stages 76, and a cumulative adding circuit 78 constituting means for cumulatively adding the output of the summing circuit 77 and the output of the summing circuit of the preceding image data processing module. The shift register 75 for the first processor stage 76 is coupled to the input port 71 for sequentially introducing image data. The shift registers 75 for the other processor stages 76 interconnect adjacent processor stages so that a different one of the image data sequentially introduced through the first processor stage shift register is shifted and supplied simultaneously to each of the juxtaposed processor stages 76.

When image data $d_{14}$ is inputted into the processor stage 76 #4 of the processing module 70A, adjacent image data $d_{13}$, $d_{12}$ and $d_{11}$ is also inputted to the corresponding processor stages 76 #3 to #1 through the shift registers 75, respectively. The image data $d_{11}$ may be outputted through an image data output port 72 for the case where the area for the spatial convolution is expanded to more than 4×4 image data. Each of the processor stages 76 is thus supplied with image data $d_{ij}$ to be processed and weight data $w_{ij}$ from the weight data memory 79 for executing the multiplication of these data. The result of the multiplication, i.e. the product data from the four processor stages 76 is supplied to the summing circuit 77 for summing the product data to produce a partial sum, which is then cumulatively added to the partial sum coming from the summing circuit of the preceding processing module through the partial sum input port 73 by the cumulative adding circuit 78. The result of the cumulative addition is supplied to cumulative adding circuit of the succeeding processing module through the operation result output port 74.

Figure 9A:
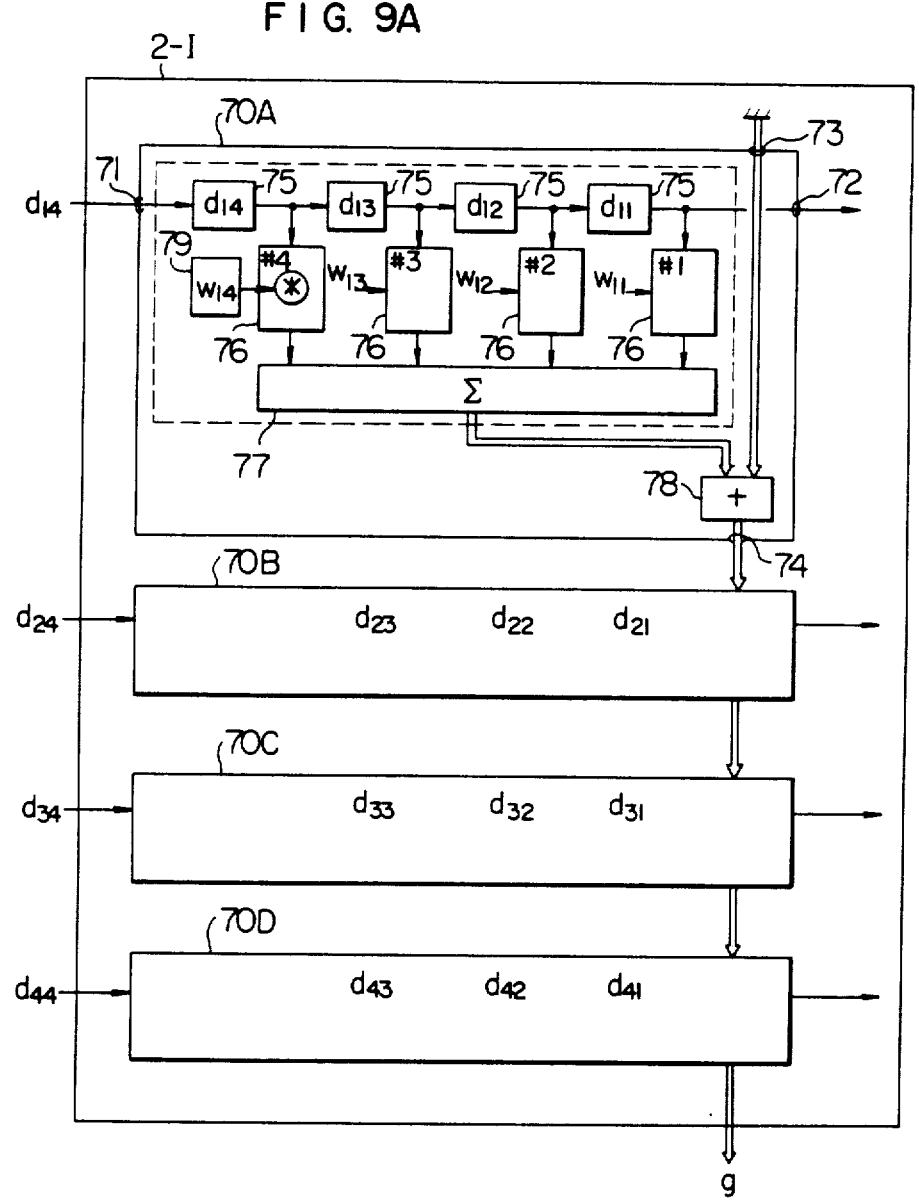
FIGS. 9A and 9B are a block diagram and an operational time chart of another embodiment of the present invention.

Accordingly, when the processing modules are employed in four stages as shown in FIG. 9A, there is outputted from the processing module 70D of the final stage a total sum g which is given by the following expression:

$$g = \sum_{i,j=1,1}^{4,4} d_{ij} \cdot w_{ij}$$

Figure 9B:
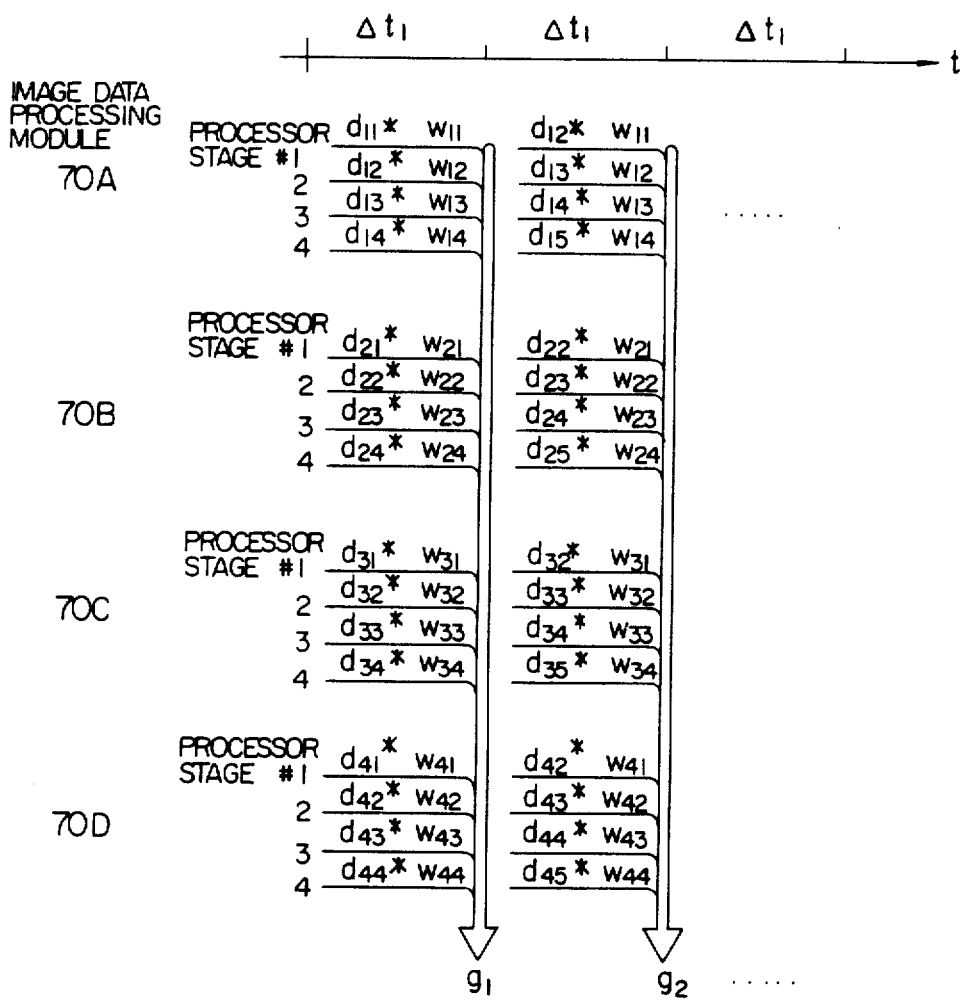

The processing mentioned above is illustrated in a time chart shown in FIG. 9B. When a processing result $g_1$ of the operations executed during a basic clock period $\Delta t_1$ is outputted, then a similar operation is performed on the adjacent 4×4 image data displaced by one column in the row direction or by one row in the column direction, i.e., by one image data corresponding to one picture element in the row or column direction during a subsequent period $\Delta t_1$, whereby the corresponding result $g_2$ is available as the output data. In this way, the results of the spatial convolutions effected for every 4×4 image data inputted successively are sequentially outputted.

Figure 10A:
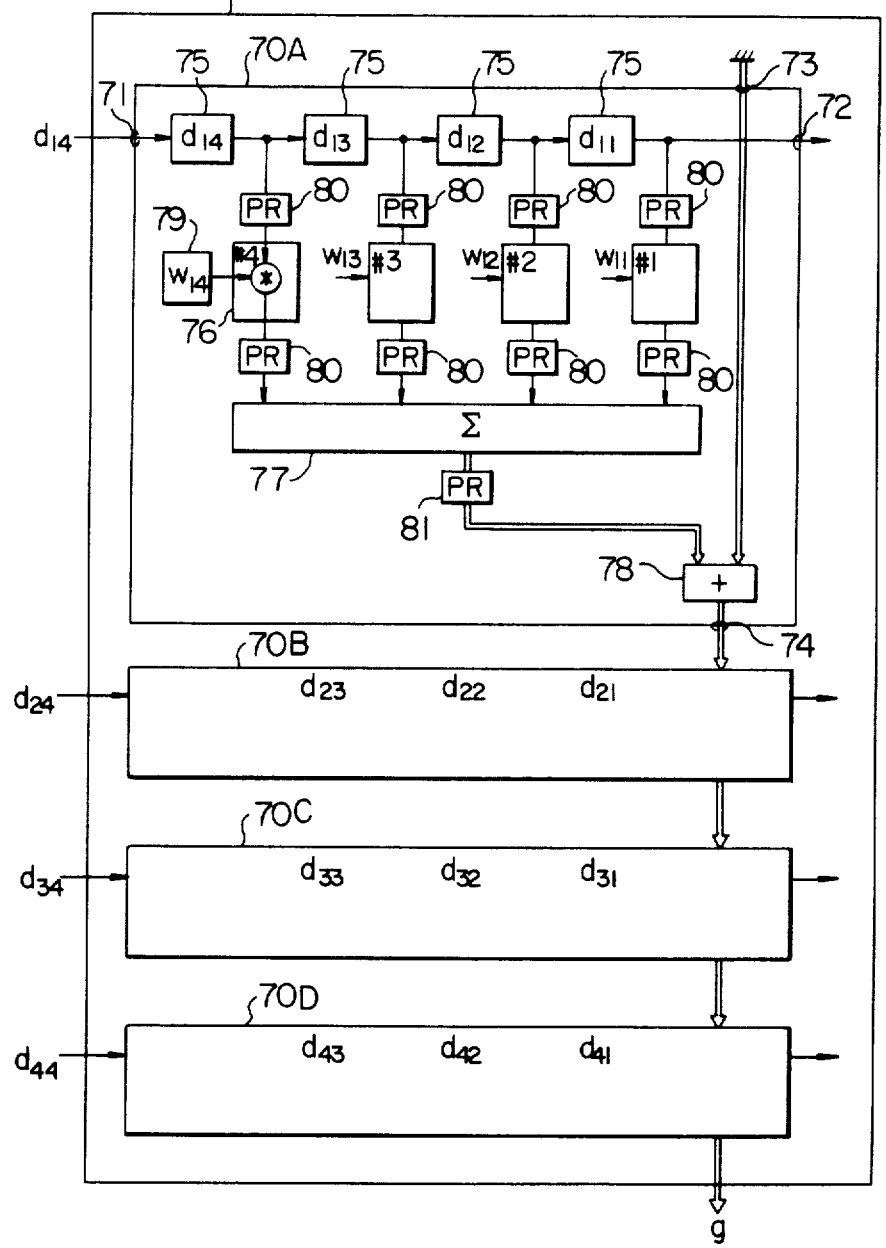

FIG. 10A shows another embodiment of the invention according to which the processing apparatus 2-I shown in FIG. 9A is so modified that the basic clock time period $\Delta t_1$ thereof is reduced by adopting a pipeline processing. More particularly, in the former embodiment, the basic clock time period $\Delta t_1$ is necessarily not smaller than the sum of the times required for the below mentioned processing steps:

(1) Inputting of an image data $d_{ij}$ to the shift register 75;

(2) Multiplication, at the processor stage 76, of an image data $d_{ij}$ by a corresponding weight data $w_{ij}$;

(3) Summing for determining a partial sum by the summing circuit 77; and (4) Cumulative addition of partial sums by the cumulative adding circuit 78.

In contrast, in the processing apparatus 2-IP shown in FIG. 10A, there are interposed pipeline registers 80 between the processing steps (1) and (2), (2) and (3) and between the processing steps (3) and (4), respectively. With this arrangement, the basic clock time period $\Delta t_2$ is reduced to the longest one of the time periods required for the above-mentioned processing steps (1) to (4).

A pair of first pipeline registers 80 are provided for each of the processor stages 76 so that each processor stage receives input image data and delivers processed image data via one and the other of the pair of the pipeline registers, and a second pipeline register 81 is provided for the summing circuit 77 so that the summing circuit 77 delivers its output via the pipeline register 81.

The operation of the processing apparatus 2-IP is illustrated in FIG. 10B. It will be seen that the processing steps similar to those steps (1) to (4) as mentioned above for each row image data of one matrix of 4×4 image data are executed during periods $\Delta t_2 - 1$ to $\Delta t_2 - 4$, respectively. At the same time, processing steps similar to those (1) to (4) for each row image data of other four successive matrices of 4×4 image data each displaced by one image data from one another are executed during the corresponding ones of the periods $\Delta t_2 - 2$ to $\Delta t_2 - 5$. In this manner, the processing speed can be significantly increased by operating successively the individual components in the pipeline manner.

FIG. 11A shows still another embodiment of the invention according to which the processing apparatus 2-IP shown in FIG. 10A is so modified that the basic clock time period $\Delta t_2$ can further be reduced. In the processing apparatus 2-IP of FIG. 10A, the basic clock time period $\Delta t_2$ tends to be restricted by the time required for the execution of the processing step similar to the above-mentioned step (4) for cumulatively adding partial sums. This is because in the case where the processing modules are realized in n stages the basic clock time period $\Delta t_2$ will amount to n times the sum of the time required for the processing by the cumulative adding circuit 78 and the time required for the inputting and the outputting of the operation results through the ports 73 and 75. The delay time involved by the inputting-/outputting operations can not be negligible particularly when the processing modules are implemented in an LSI configuration. In the light of the above, in the image data parallel processing apparatus 2-IPS shown in FIG. 11A, a third pipeline register 82 is inserted in the cumulative addition input path for the adding circuit 78 so that the circuit 78 receives the output of the adding circuit of the preceding adjacent processing module, whereby the cumulative addition of the partial sums of adjacent processing modules 70A to 70D are executed through the pipeline operation. With this arrangement, the basic clock time period $\Delta t_3$ can be reduced to 1/n of $\Delta t_2$. However, as illustrated in FIG. 11B, it is necessary to compensate for misalignment among the individual processing modules 70A to 70D with respect to the timing with which the partial sums are arithmetically determined and cumulatively added in each processing module. For compensating the misalignment of the timing, a skew correcting shift register or a delay register 93 which may be of variable number of stages is provided for each of the processing modules 70B to 70D except the first stage processing module 70A so that delivery of the output of the summing circuit is delayed. The delay register 93 in each of the modules 70B to 70D is disposed immediately following the input port 71. Since the pipeline register 82 inserted in the cumulative addition input path in each of the processing modules 70A to 70D has a single stage, the number of the stages for the skew correcting or delay shift register 93 provided for the processing modules 70B to 70D are selected as follows:

One stage for the processing module 10B, two stages for the processing module 10C, and three stages for the processing module 10D.

The misalignment can thus be corrected or compensated, so that the pipeline operations are allowed to be effected sequentially during a succession of the periods each corresponding to the basic time period $\Delta t_3$ as is illustrated in the time chart of FIG. 11B.

As will be readily appreciated, the skew correcting or delay shift register 93 may be disposed immediately succeeding the summing circuit 77 or immediately preceding or succeeding the processor stage 76 for compensating the offset or misalignment in the timing.

Figure 12A:
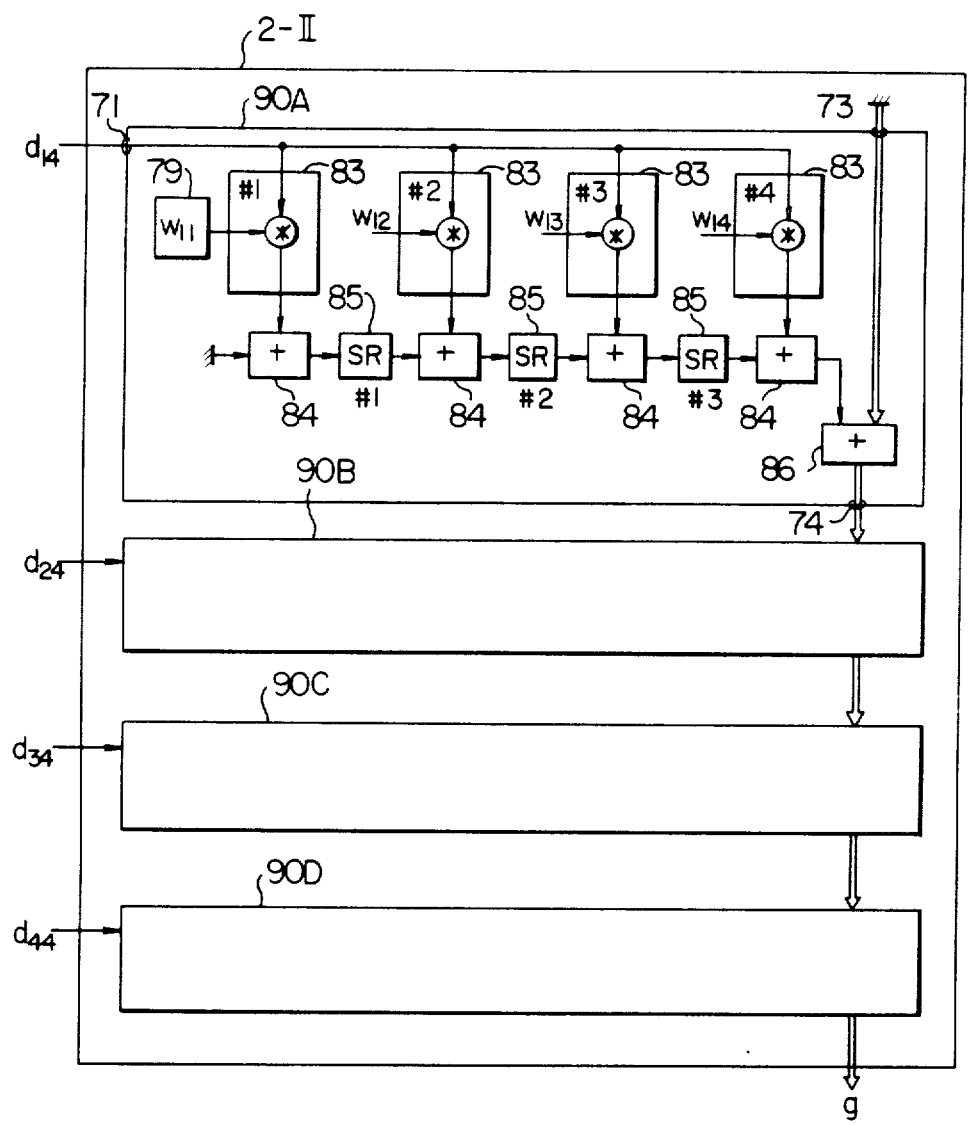
FIGS. 12A and 12B are a block diagram and an operational time chart of another embodiment of the present invention.

FIG. 12A shows another embodiment of the image data processing apparatus according to the invention. In the embodiments shown in FIGS. 9A, 10A and 11A, the input image data is supplied to the processor units by way of shift registers. In contrast, in the image data parallel processing apparatus 2-II shown in FIG. 12A, input image data is supplied in common to individual processor units and the results of multiplications executed by the processor units are cumulatively added to one another by adder-register sets each including an adder 84 and a register 85 to thereby obtain a partial sum.

In the present embodiment, it is also assumed that 4 rows×4 columns local image data are intended to be processed. The processing apparatus 2-II is in a large scale integrated circuit configuration including four image data processing modules (the same number of processing modules as the row number) 90A to 90D in cascade connection. The apparatus 2-II is supplied with local image data column by column simultaneously or parallelly from the image memory 3 and the processing results may be stored again in the image memory 3.

Each of the image data processing modules 90A to 90D has one input port 71 through which image data to be processed is to be introduced and one output port 74 through which processing results are to be delivered. Each of the processing modules 90A to 90D includes a weight data memory 79 constituting means having four weight data (the same number of weight data as the column number) stored therein, four juxtaposed processor stages (the sme number of processor stages as the column number) 83 each including a multiplier coupled to the weight data memory 79 and each being coupled in common to the input port 71, an adder 84 provided for each of the processor stages 83 and arranged to receive the output of the associated processor stage as one input thereto, three shift registers 85 each interposed between two adjacent adders and each storing the output of the adder on the input side of the shift register in question and supplying its output as another input to the adder on the output side of the shift register in question, and a cumulative adding circuit 86 constituting means for cumulatively adding the output of the last stage adder 84 and the output of the last stage adder of the preceding processing module.

Figure 12B:
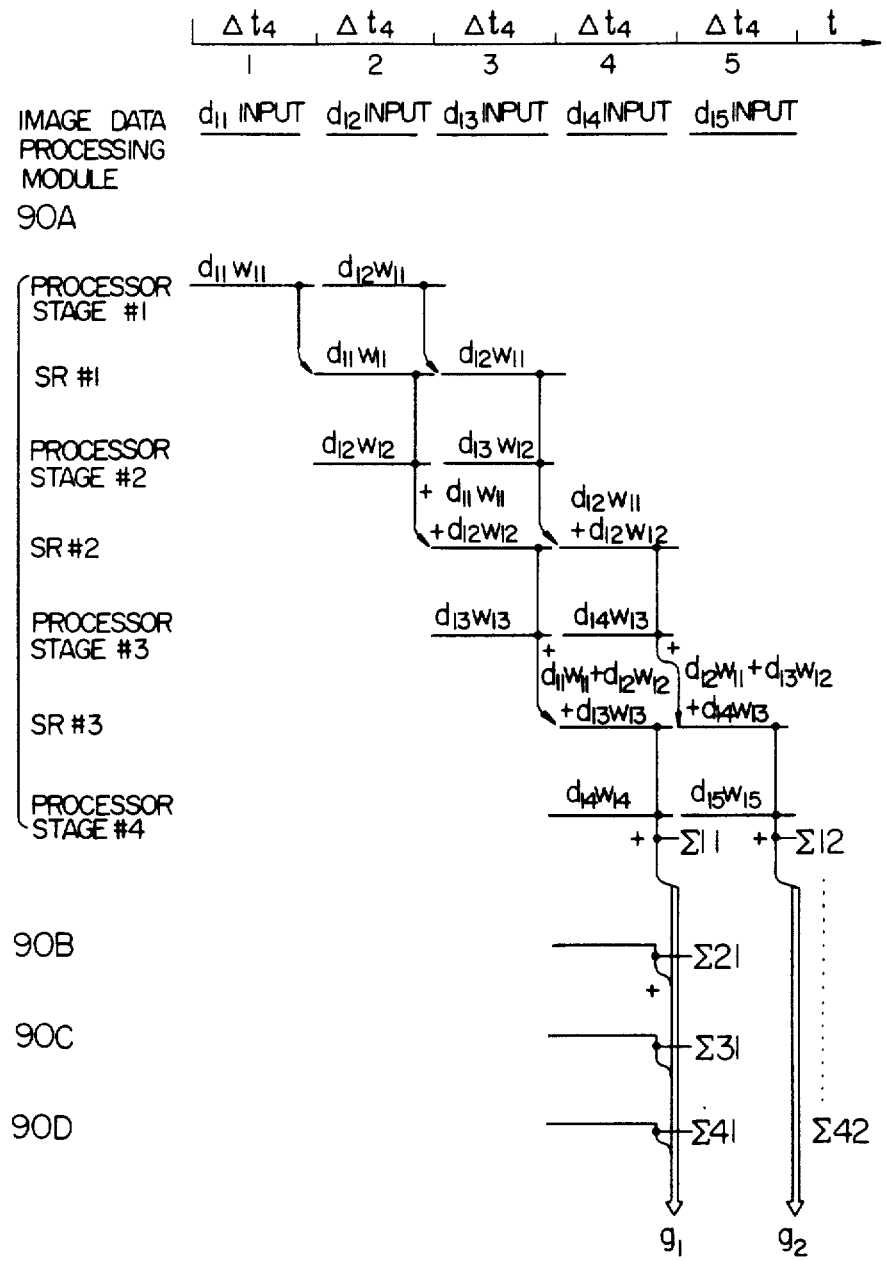

The operation of the processing apparatus 2-II will be described with reference to FIG. 12B showing a time chart therefor. Referring to the processing module 90A, during a time period $\Delta t_4-1$, image data $d_{11}$ is inputted through the input port 71 and a product $d_{11} \times w_{11}$ of the input image data $d_{11}$ and the corresponding weight data $w_{11}$ read out from the weight data memory 79 is arithmetically determined by the processor stage 83 #1 and loaded into the register 85 #1 during the succeeding period or clock time $\Delta t_4-2$.

Image data $d_{12}$ inputted in the time period $\Delta t_4-2$ is multiplied by the corresponding weight data $w_{12}$ by the processor stage 83 #2 to produce a product $d_{12} \times w_{12}$. During the succeeding time period $\Delta t_4-3$, the product $d_{12} \times w_{12}$ is added to the product $d_{11} \times w_{11}$ stored in the register 85 #1 by the adder 84 to thereby produce a sum $(d_{11} \times w_{11} + d_{12} \times w_{12})$ which is stored in the register 85 #2.

Image data $d_{13}$ inputted in the time period $\Delta t_4-3$ is multiplied by the corresponding weight data $w_{13}$ in the processor stage 83 #3 to produce a product $d_{13} \times w_{13}$ which is added to the content $(d_{11} \times w_{11} + d_{12} \times w_{12})$ of the register 85 #2 by the adder 84 to thereby produce a sum $(d_{11} \times w_{11} + d_{12} \times w_{12} + d_{13} \times w_{13})$ which in turn is stored in the register 85 #3 during the time period $\Delta t_4-4$.

Image data $d_{14}$ inputted in the time period $\Delta t_4-4$ is multiplied by the corresponding weight data $w_{14}$ in the processor stage 83 #4 to produce a product $d_{14} \times w_{14}$ which is added to the content $(d_{11} \times w_{11} + d_{12} \times w_{12} + d_{13} \times w_{13})$ of the register 85 #3 by the final stage adder 84 to thereby produce a sum $\Sigma 11 = d_{11} \times w_{11} +, \ldots, d_{14} \times w_{14}$. The partial sum thus obtained is cumulatively added during the succeeding time period $\Delta t_4-5$ by the cumulative adding circuit 86 provided in each of the processing modules 90A to 90D. As a result, there is produced from the cumulative adding circuit 86 of the final stage processing module 90D a total sum g given by the following expression:

$$g = \sum_{i,j=1,1}^{4,4} f_{ij} \times w_{ij}$$

Processing results $g_1, g_2, \ldots$ by the spatial convolutions are successively outputted at the basic clock time interval $\Delta t_4$.

According to this embodiment, since image data is supplied to the respective processor stages in common in each processing module, it is possible to expand the area of the local image data without additionally providing an output port for delivering the output of the final processor stage (such as the output port 72 shown in FIG. 9A), which leads to effective reduction of the number of pins required for an LSI image processing apparatus.

It should be noted that, in order to reduce the time period $\Delta t_4$, modifications of this embodiment by employing pipeline registers and/or delay registers are possible similar to the modified versions of the embodiment of FIG. 9A, as shown in FIGS. 10A and 11A. Description on such modified versions is omitted because they are readily understood by anyone in the art from the foregoing description.

Figure 13A:
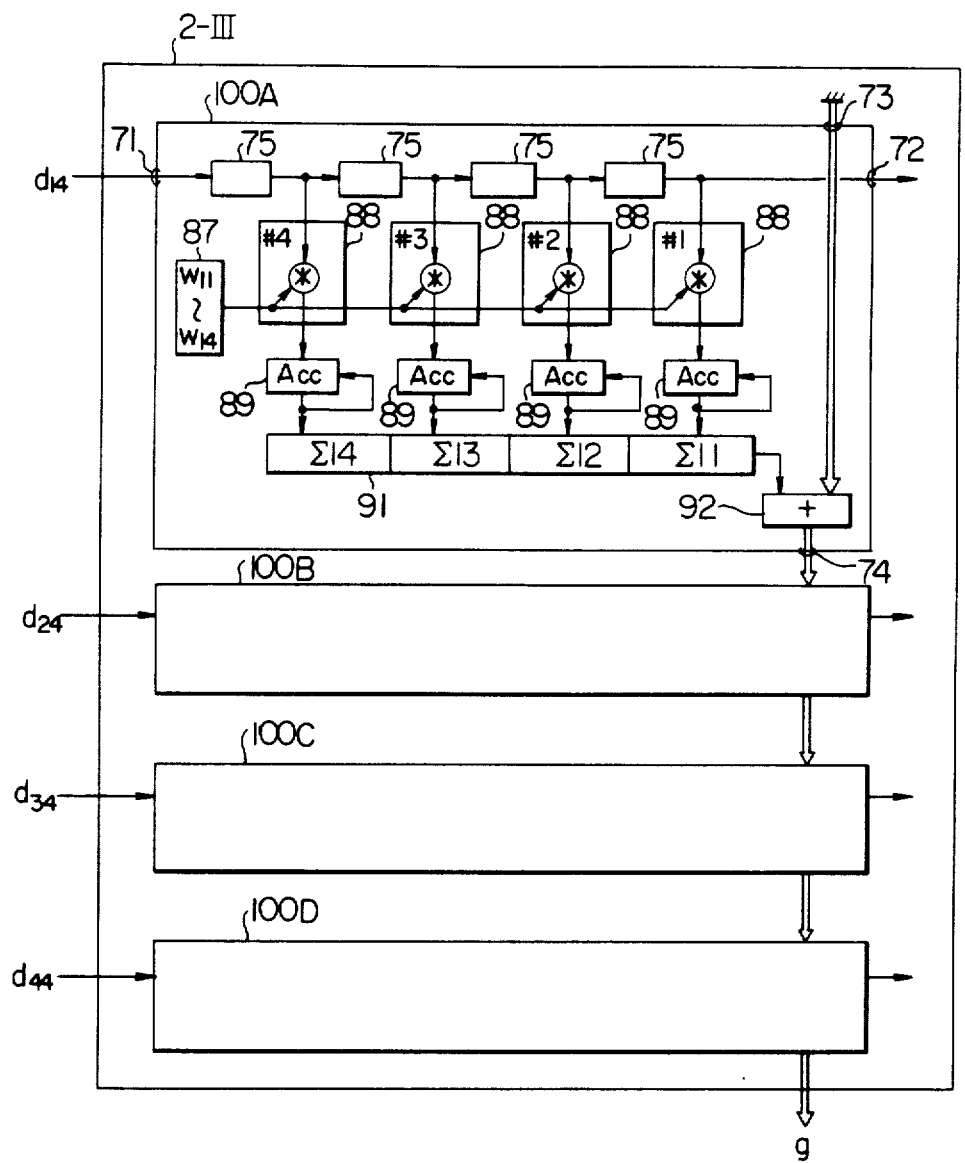

FIG. 13A shows another embodiment of the present invention. In the embodiments described in the foregoing, each of the processor stages or processor units is provided with weight data independent of one another. In contrast thereto, the image data processing apparatus 2-III shown in FIG. 13A is in a large scale integrated circuit configuration including four image data processing modules (the same number of processing modules as the row number) 100A to 100D in cascade connection.

Each of the image data processing modules 100A to 100D has one input port 71 through which image data to be processed is to be introduced and one output port 74 through which processing results are to be delivered. Each of the processing modules 100A to 100D includes a weight data memory 87 constituting means having four weight data (the same number of weight data as the column number) stored therein, four juxtaposed processor stages (the same number of processor stages as the column number) 88 each including a multiplier coupled in common to the weight data memory 87, a shift register 75 provided for each of the processor stages 88, an accumulator 89 provided for each of the processor stages 88 for cumulative adding the output of the associated processor stage, a shift register 91 serving to store individual outputs of the accumulators 89 separately, and cumulative adding circuit 92 constituting means for cumulatively adding each of the four separate outputs from the shift register 91 to the corresponding each of each of the four outputs from the shift register 91 of the preceding adjacent processing module. The shift register 75 for the first processor stage 88 is coupled to the input port 71 for sequentially introducing image data into the processing module. The shift registers 75 for the other processor stages 88 interconnect two adjacent processor stages so that a different one of the sequentially introduced image data is shifted and supplied simultaneously to each of the processor stages 88.

The operation of the image data parallel processing apparatus 2-III will be described with reference to FIG. 13B showing a time chart therefor.

It is assumed that image data $d_{14}$ has been inputted through the image data input port 71 in the time period $\Delta t_5-1$. At this time, the processor stages 88 #1 to #4 have been supplied with image data $d_{11}$, $d_{12}$, $d_{13}$ and $d_{14}$ through the shift registers 75, respectively, and weight data $w_{11}$ is read out from the weight data memory 87, so that products of the weight data $w_{11}$ and the image data $d_{11}$ to $d_{14}$ are determined, respectively. Then, the contents held in the accumulators 89 at the beginning of the time period $\Delta t_5-1$ are cleared and the products of $w_{11}$ and $d_{11}$ to $d_{14}$ are stored in these accumulators 89, respectively.

When image data $d_{15}$ is inputted during the succeeding time period $\Delta t_5-2$, the image data $d_{12}$, $d_{13}$, $d_{14}$ and $d_{15}$ is supplied to the processor stages 88 #1, #2, #3 and #4, respectively, and respective products of this image data and the next weight data $w_{12}$ are determined. Subsequently, these products are added to the contents of the corresponding accumulators 89 therein. As a consequence, the partial sum $(d_{11} \times w_{11} + d_{12} \times w_{12})$ is held in the accumulator 89 for the processor stage 88 #1, while the partial sum $(d_{12} \times w_{11} + d_{13} \times w_{12})$ is held in the accumulator 89 for the processor stage 88 #2, for example.

Similar processing is carried out during the succeeding time periods $\Delta t_5-3$ and $\Delta t_5-4$, with a result that first partial sums given below are obtained from the accumulators 89 for the processor stages 88 #1 to #4, respectively. Namely, $$\Sigma 11 = d_{11} \times w_{11} + d_{12} \times w_{12} + d_{13} \times w_{13} + d_{14} \times w_{14}$$

from the accumulator 89 for the processor stage 88 #1, $$\Sigma 12 = d_{12} \times w_{11} + d_{13} \times w_{12} + d_{14} \times w_{13} + d_{15} \times w_{14}$$

from the accumulator 89 for the processor stage 88 #2, $$\Sigma 13 = d_{13} \times w_{11} + d_{14} \times w_{12} + d_{15} \times w_{13} + d_{15} \times w_{14}$$

from the accumulator 89 for the processor stage 88 #3, and $$\Sigma 14 = d_{14} \times w_{11} + d_{15} \times w_{12} + d_{16} \times w_{13} + d_{17} \times w_{14}$$

from the accumulator 89 for the processor stage 88 #4.

These partial sums are individually and separately loaded in the shift register 91 at the end of the time period $\Delta t_5 - 4$.

During the time periods $\Delta t_5 - 5$ to $\Delta t_5 - 8$, the contents of the shift registers 91 of the individual processing modules 100A, 100B, 100C and 100D, i.e., $\Sigma 11$ to $\Sigma 14$, $\Sigma 21$ to $\Sigma 24$, $\Sigma 31$ to $\Sigma 34$, and $\Sigma 41$ to $\Sigma 44$ are successively cumulative added by the cumulatively adding circuits 92 incorporated in the processing modules, whereby the results of cumulative additions $$g_1 = \sum_k k1, g_2 = \sum_k k2, g_3 = \sum_k k3 \text{ and } g_4 = \sum_k k4$$

are obtained as the outputs. During the same time periods $\Delta t_5 - 5$ to $\Delta t_5 - 8$ as this production of these outputs, image data $d_{15}$ to $d_{18}$, $d_{16}$ to $d_{19}$, $d_{17}$ to $d_{20}$ and $d_{18}$ to $d_{21}$ is processed by the processor stages 88 #1, #2, #3 and #4, respectively, in the same manner as the processing executed during the time periods $\Delta t_5 - 1$ to $\Delta t_5 - 4$ mentioned above, whereby the resultant partial sums are cumulatively added in the same manner as described above to produce the processing results $$g_5 = \sum_k k5, g_6 = \sum_k k6, g_7 = \sum_k k7 \text{ and } g_8 = \sum_k k8,$$

respectively. In this way, the spatial convolutions are accomplished successively.

This embodiment shown in FIG. 13A may also be susceptible by the employment of pipeline registers and/or delay registers as described hereinbefore in conjunction with the embodiments shown in FIGS. 10A and 11A as modifications of FIG. 9A embodiment, to thereby reduce the length of the basic clock time period $\Delta t_5$.

In the embodiments shown in FIGS. 9A, 10A, 11A, 12A and 13A the cumulative addition of the outputs of the respective processing modules is executed by the cumulative adding circuits connected in cascade, each of which is incorporated in the associated processing module. However, when the number of connecting pins gives rise to a problem in implementing the processing apparatus in an LSI form, the processing modules in an LSI form may exclude the cumulative adding circuits to include, for example, that portion of the processing module shown in FIG. 9A which is enclosed by a broken line, and the cumulative addition of the outputs of the processing modules may be executed externally in parallel.

As will be appreciated from the foregoing, there has been provided according to the embodiments shown in FIGS. 9A, 10A, 11A, 12A and 13A an apparatus for processing in parallel the local image data, having an architecture suited for implementing the apparatus configuration by virtue of such features that the number of the input/output ports is significantly reduced, and the apparatus may be constituted by a plurality of processing modules juxtaposed regularly.

We claim:

1. An apparatus for parallel processing of m rows by n columns (m, n: integers) of local image data from an image data source, comprising:
    means for receving said columns of local image data sequentially as series transmitted data;
    a plurality of data memories each having m weight data stored therein and each serving to store the m local image data from a respective one of said n columns serially introduced via said receiving means;
    a plurality of processor stages each including a multiplier and being provided one for each of said data memories for producing the products of each of said m image data with all of said m weight data in successive operations, said data memories and the corresponding processor stages constituting respective processor units connected in cascade;
    means for sequentially shifting said serially introduced image data between adjacent ones of said processor units to provide said sequential image data to be processed successively to said multipliers so that said products of said m image data with different ones of said m weight data are simultaneously produced from all of said processor units each time a shift of said image data is effected; and
    means for summing the outputs of said multipliers in said processor stages.

2. An apparatus according to claim 1, in which each of said data memories includes a two-port RAM, one port for delivering renewed image data and weight data to be fed to an associated processor stage, the other port for delivering image data to be shifted to the data memory of the next adjacent processor unit.

3. An apparatus according to claim 1, in which each of said data memories includes a shift register and a one-port RAM, the arrangement being such that the renewed image data is supplied, via said shift register, to said RAM for storage and to the multiplier in the corresponding processor stage for production of said product and that image data stored in said RAM is shifted, via said shift register, to the data memory in the succeeding processor units.

4. An apparatus according to claim 1, in which each of said data memories includes a shift register for storing predetermined number of shifted image data and a one-port RAM having said weight data stored therein, the arrangement being such that the renewed image data is supplied from the shift register in the preceding processor unit to the first-mentioned shift register for storage and to the multiplier in the corresponding processor stage for production of said product and that image data stored in the first-mentioned shift register is shifted therefrom to the data memory in the next adjacent processor unit.

5. An apparatus for parallel processing of local image data from an image data source, said local image data including $m \times n$ image data, where m and n represent the numbers of rows and columns covering a two-dimensional area of predetermined size, the apparatus comprising:

means for receiving said local image data sequentially as serial data;

n processor stages each including a data memory having m weight stored therein and each serving to store the m image data from a respective one of said n columns sequentially supplied via said receiving means, each processor stage including a multiplier coupled to said data memory for producing products of said image data and said weight data, said data memories in said processor stages further having m memory area respectively and being coupled to one another in cascade;

means for sequentially shifting said sequentially supplied image data between the data memories of adjacent ones of said processor stages for each individual row of data so that each of said data memory areas has always one image data stored therein, thereby simultaneously effecting said production of products of said m image data with different ones of said m weight data in said multipliers each time a shift of said image data is effected; and means for summing the outputs of said multipliers in said processor stages.

6. An apparatus for parallel processing of m rows and n columns (m, n: integers) of local image data representing a kernel portion of a data frame from an image data source, comprising:

means for receiving said kernel portion of local image data in sequence from said image data source;

memory means having n weight data stored therein;

n processor stages connected in cascade and each including a multiplier, the multipliers in said processor stages being connected to said receiving means so as to be simultaneously supplied with said image data representing said kernel portion via said receiving means and being coupled to said memory means for simultaneously producing during successive operations the products of each of said supplied local image data with a plurality of said weight data received from said memory means; and means for summing the outputs of said processor stages during each of said successive operations.

7. An apparatus for parallel processing of local image data from an image data source, said local image data including m × n image data where m and n represent the numbers of rows and columns covering a two-dimensional area of predetermined size forming a kernel portion of a data frame, the apparatus comprising m image data processing modules in cascade connection each responsible for the image data of a different one of said rows, each of said m image data processing modules including:

means for receiving one of the m rows of said local image data sequentially;

memory means having n weight data stored therein;

n processor stages juxtaposed and each having a multiplier coupled to said memory means, said multipliers in said juxtaposed processor stages being connected to said receiving means so as to be simultaneously supplied with said one row of said local image data to simultaneously produce products of said supplied image data and the weight data from said memory means;

means for summing the outputs of said multipliers in said processor stages; and means for cumulatively adding the output of said summing means and the output of the summing means of the preceding image data processing module in said cascade connection.

8. An apparatus according to claim 7 in which said receiving means in each of said image data processing modules includes n shift registers provided one for each of said processor stages, the shift register for the first processor stage being connected to sequentially receive said local image data from said local image data source, each of the other shift registers interconnecting two adjacent ones of said processor stages so that said sequentially introduced local image data is simultaneously supplied from said shift registers to said multipliers in said processor stages.

9. An apparatus according to claim 8, in which said memory means in each of said image data processing modules has such a structure that different one of said n weight data is supplied to each of said multipliers in said processor stages.

10. An apparatus according to claim 8, in which said memory means in each of said image data processing modules has such a structure that said n weight data are supplied in common to each of said multipliers in said processor stages one by one.

11. An apparatus according to claim 7, in which said receiving means in each of said image data processing modules includes a direct connection between each of said processor stages so that image data is sequentially supplied to said processor stages in common.

12. An apparatus according to claim 9, 10 or 11, in which in each of said image data processing modules:

a pair of first pipeline registers are provided for each of said processor stages so that each processor stage receives input image data via one of said pair of first pipeline registers and delivers processor image data via the other of said pair of first pipeline registers; and a second pipeline register is provided for said summing means so that said summing means delivers its output via said second pipeline register.

13. An apparatus according to claim 12, in which a third pipeline register is provided for said adding means in each of said image data processing modules so that said adding means receives the output of the adding means of the immediately preceding image data processing module via said third pipeline register, and each of the image data processing modules except the most preceding image data processing module is provided with a delay register for delaying supply of the output of the summing means for ensuring cumulative addition of the outputs of the adding means of said m image data processing modules in cascade connection.

* * * * *